United States Patent
Wu

(10) Patent No.: US 8,718,317 B2
(45) Date of Patent: May 6, 2014

(54) MOVING-MAGNET ELECTROMAGNETIC DEVICE WITH PLANAR COIL

(76) Inventor: Zonghan Wu, Nanjing (CN)

( * ) Notice: Subject to any disclaimer, the term of this patent is extended or adjusted under 35 U.S.C. 154(b) by 182 days.

(21) Appl. No.: 13/111,491

(22) Filed: May 19, 2011

(65) Prior Publication Data

US 2012/0294474 A1 Nov. 22, 2012

(51) Int. Cl.
| | | |
|---|---|---|
| H04R 1/00 | (2006.01) | |
| H04R 9/06 | (2006.01) | |
| H04R 11/02 | (2006.01) | |
| G10K 7/00 | (2006.01) | |
| H05K 5/00 | (2006.01) | |
| G10K 13/00 | (2006.01) | |
| H04R 7/00 | (2006.01) | |

(52) U.S. Cl.
USPC ........... 381/400; 381/423; 381/426; 381/427; 381/431; 181/143; 181/148; 181/157; 181/167; 181/168

(58) Field of Classification Search
CPC .............. H04R 9/02; H04R 9/06; H04R 9/45; H04R 7/20; H04R 7/125; H04R 31/003; H04R 9/047; H04R 7/02; H04R 7/24; H04R 7/04; H04R 1/021; H04R 1/2811; H04R 1/345; H04R 7/12; H04R 1/24; H04R 1/2834; H04R 7/00; G10H 1/04; H10B 3/18
USPC .......... 381/400, 423, 426, 427, 431; 181/143, 181/148, 157, 167, 168
See application file for complete search history.

(56) References Cited

U.S. PATENT DOCUMENTS

| | | | | |
|---|---|---|---|---|
| 6,532,834 | B1 * | 3/2003 | Pinto et al. ............... | 73/862.626 |
| 6,600,400 | B1 * | 7/2003 | Andou et al. .................. | 335/252 |
| 6,789,429 | B2 * | 9/2004 | Pinto et al. ...................... | 73/718 |
| 7,116,796 | B1 * | 10/2006 | Reenberg ...................... | 381/431 |
| 7,302,077 | B2 * | 11/2007 | Bachmann et al. ............ | 381/412 |
| 7,502,486 | B2 * | 3/2009 | Shin et al. ...................... | 381/396 |
| 2003/0128847 | A1 * | 7/2003 | Smith .............................. | 381/67 |
| 2007/0071274 | A1 * | 3/2007 | Andersen et al. ............. | 381/404 |
| 2007/0237352 | A1 * | 10/2007 | Andersen et al. ............. | 381/414 |
| 2008/0031487 | A1 * | 2/2008 | Sorensen et al. .............. | 381/396 |
| 2008/0063235 | A1 * | 3/2008 | Takewa .......................... | 381/412 |
| 2009/0257617 | A1 * | 10/2009 | Ikeda et al. ................... | 381/410 |
| 2010/0278371 | A1 * | 11/2010 | Hanada .......................... | 381/398 |
| 2011/0013799 | A1 * | 1/2011 | Fang et al. ..................... | 381/355 |
| 2011/0274298 | A1 * | 11/2011 | Yang .............................. | 381/174 |
| 2011/0274309 | A1 * | 11/2011 | Doh et al. ...................... | 381/398 |

FOREIGN PATENT DOCUMENTS

| | | |
|---|---|---|
| CN | 101711006 A | 5/2010 |
| CN | 201571198 U | 9/2010 |

* cited by examiner

*Primary Examiner* — Duc Nguyen
*Assistant Examiner* — Sean H Nguyen
(74) *Attorney, Agent, or Firm* — Mintz Levin Cohn Ferris Glovsky and Popeo, P.C.

(57) ABSTRACT

An electromagnetic device includes a housing, a planar coil disposed inside the housing, and a magnetic diaphragm disposed inside the housing, wherein the plane of the planar coil is substantially in parallel with the plane of the magnetic diaphragm, wherein the planar coil is separated from the magnetic diaphragm, and wherein the magnetic diaphragm is moveable in the presence of an exterior pressure.

13 Claims, 5 Drawing Sheets

MOVING-MAGNET ELECTROMAGNETIC DEVICE WITH PLANAR COIL

FIELD OF INVENTION

The present invention relates generally to electromagnetic devices, and more particularly to electromagnetic devices with moving magnet and planar coil.

BACKGROUND

Conventional moving-coil microphones generally contain a fixed permanent magnet with a suspended coil (the moving coil). A diaphragm is affixed to the coil when there is no internal tension and no external force. When a sound from the environment reaches the microphone, the sound pressure causes the diaphragm (and the affixed coil) to vibrate. The motion of the coil in the magnetic field generates motional electromotive force (EMF). A voltage is then output according to the sound pressure, completing the acoustic-electric conversion. Conventional moving-coil microphones, however, are difficult to be miniaturized because of the complexity of their internal components.

Conventional condenser microphones may be capable of being miniaturized. But the capacitance of conventional condenser microphones is typically in the range of picofarads (pF or $10^{-12}$ F), giving rise to high impedance of condenser microphones. The high impedance causes severe attenuation during transport, rendering long-distance transmission impossible. To address this problem, an impedance converter is normally needed. A field-effect transistor (e.g., a junction gate field-effect transistor or J-FET) typically serves as an impedance converter. Although a J-FET can be made very small, its thermo characteristics and susceptibility to electromagnetic interferences may diminish the quality of condenser microphones.

SUMMARY OF INVENTION

In general, in an aspect, the invention provides an electromagnetic device that includes a housing, a planar coil disposed inside the housing, and a magnetic diaphragm disposed inside the housing, wherein the plane of the planar coil is substantially in parallel with the plane of the magnetic diaphragm, wherein the planar coil is separated from the magnetic diaphragm, and wherein the magnetic diaphragm is moveable in the presence of an exterior pressure.

Implementations of the invention may provide one or more of the following features. The planar coil includes multiple layers, whereby magnetic fields generated from the multiple layers are in the same orientation. The electromagnetic device further includes a spacer positioned between the planar coil and the magnetic diaphragm. The magnetic diaphragm contains at least one stoma. The housing contains at least one stoma. The magnetic diaphragm is made of Nd—Fe—B micro-powder film. The planar coil is in the form of a wound-up vortex or polygon.

Implementations of the invention may also provide one or more of the following features. The magnetic diaphragm includes an exterior ring structure, an interior area, and at least one connector connecting the exterior ring structure and the interior area, wherein the interior area is magnetized.

In general, in another aspect, the invention provides a method of making magnetic diaphragm, the method including packaging magnetic powders, mixing the magnetic powders into a melted polymer, and infiltrating the magnetic powders into the polymer film through thermal pressing and stretching.

In general, in yet another aspect, the invention provides a method of making magnetic diaphragm, the method including mixing magnetic powders within a gel, coating the gel onto a first polymer film, coating the gel onto a second polymer film, combining the first coated polymer film with the second coated polymer film, and magnetizing the combined film.

Implementations of the invention may provide one or more of the following features. The coating of the first and second polymer films is via a sol-gel or rejection gel method. The first and second polymer films are made of the same polymer material. The first and second polymer films are made of different polymer material. The first and second polymer films are combined with the coated surfaces facing inside.

Implementations of the invention may also provide one or more of the following features. The method of making magnetic diaphragm further includes forming at least one stoma on the magnetic diaphragm by etching. The method of making magnetic diaphragm further includes forming at least one stoma on the magnetic diaphragm by etching.

Various aspects of the invention can provide one or more of the following capabilities. Impedance of the electromagnetic device can be lowered when compared with prior techniques. A moving-magnet electromagnetic device can be packaged in small form factor. Ease of manufacturing of electromagnetic devices can be increased. Quality of miniature electromagnetic devices can be improved.

These and other capabilities of the invention, along with the invention itself, will be more fully understood after a review of the following figures, detailed description, and claims.

DETAILED DESCRIPTION

Embodiments of the invention can provide an electromagnetic device with a moving magnet and a planar coil. Possible advantages of the new electromagnetic devices include low impedance (reducing, or even possibly eliminating the need of impedance converters), capability of long-distance transmission, potential of being miniaturized, low-cost and easy manufacturing, and high quality. Other embodiments are within the scope of the invention.

Figure 1:
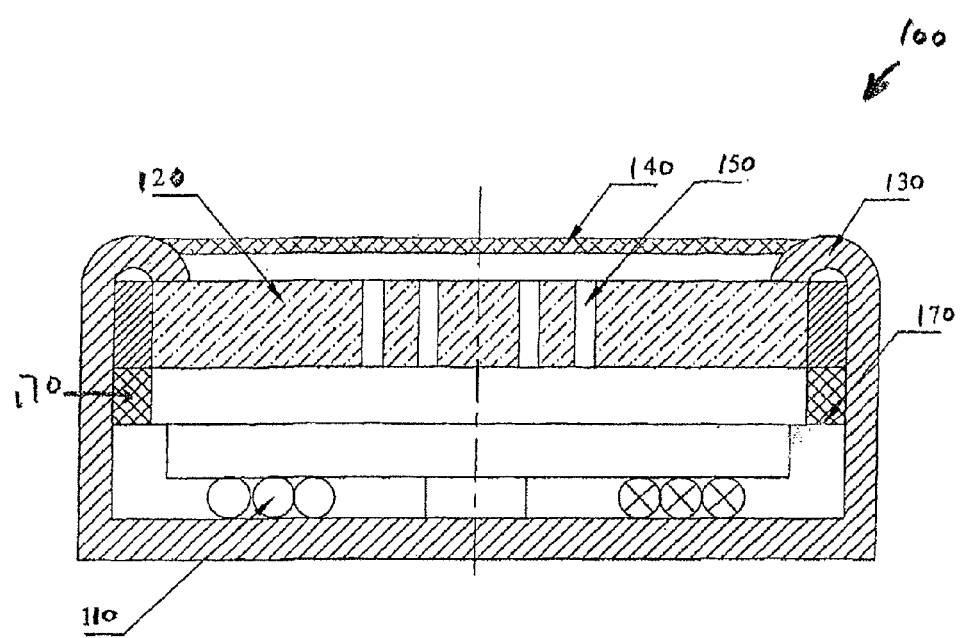
FIG. 1 illustrates a cross-section view of a microphone according to one embodiment of the invention.
Figure 2:
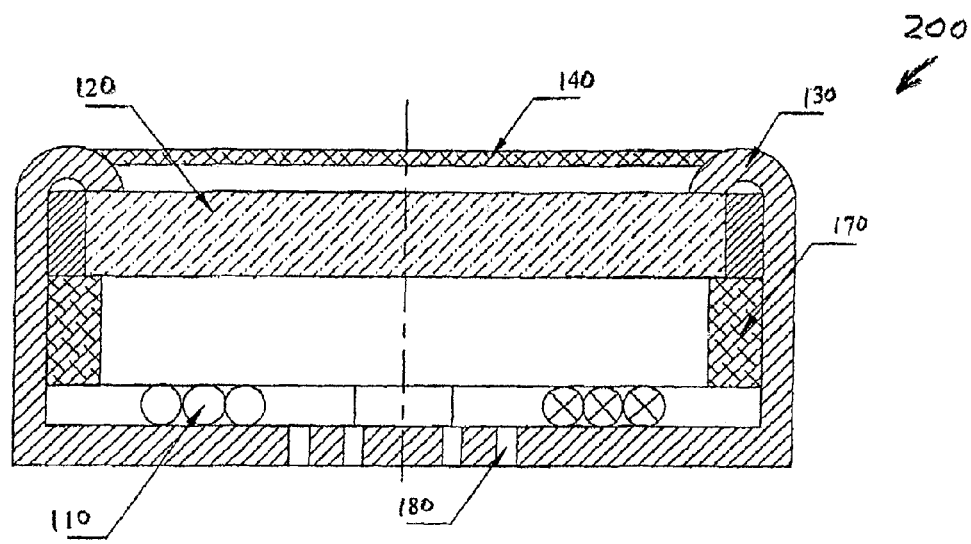
FIG. 2 illustrates a cross-section view of a microphone according to another embodiment of the invention.
Figure 3:
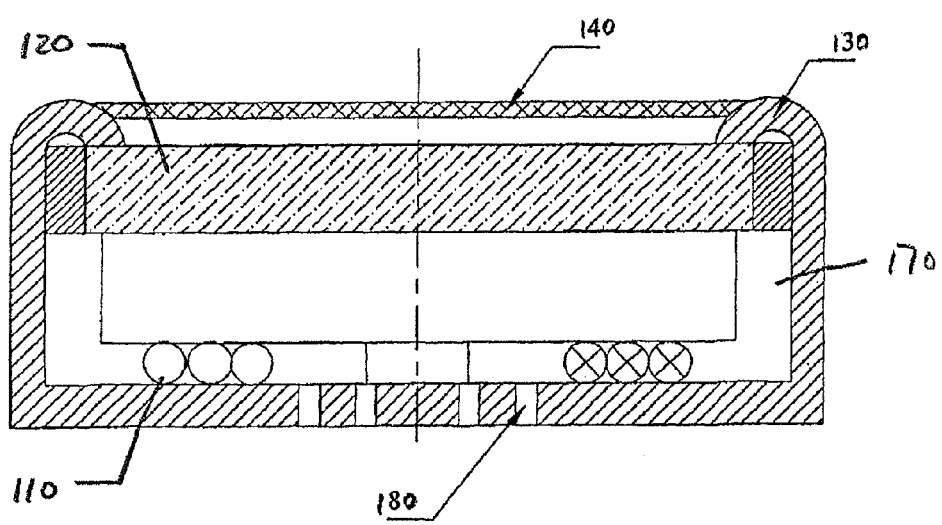
FIG. 3 illustrates a cross-section view of a microphone according to yet another embodiment of the invention.

Referring to FIGS. 1, 2, and 3, microphones 100, 200, and 300 contain a planar coil 110 and a magnetic diaphragm 120 that are positioned inside a housing unit 130. The plane of the planar coil 110 is preferably substantially in parallel with the plane of the magnetic diaphragm 120. At least one spacer 170 preferably separates the planar coil 110 from the magnetic diaphragm 120 so that they are not in contact with each other. The spacer 170 can be a separate component positioned between the planar coil 110 and the magnetic diaphragm 120. Alternatively, the spacer 170 can be affixed onto the magnetic diaphragm 120 (e.g., as in FIG. 1) or the housing unit 130 (e.g., as in FIG. 2). The spacer 170 can also be a protrusion formed on the edge of the plane of the planar coil 110 (e.g., as in FIG. 3). The spacer 170 can be in various forms, such as pad, ring, or protrusion. In some embodiments, the magnetic diaphragm 120 is affixed to a ring structure (e.g., a metal ring) which can help achieve a desired smoothness of the magnetic diaphragm 120. In these embodiments, the ring structure itself can be used as the spacer 170 separating the magnetic diaphragm 120 from the planar coil 110. The magnetic diaphragm 120 can contain at least one stoma 150. The housing unit 130 can also contain at least one stoma 180. The stoma 180 can lead to the gap between the planar coil 110 and the magnetic diaphragm 120. A dust cover 140 can be affixed to the housing unit 130.

The sensitivity of the microphones illustrated in FIGS. 1, 2, and 3 is preferably proportional to $1/(S_d+S_b)$, where $S_d$ is the effective stiffness of the magnetic diaphragm 120; and $S_b$ is the stiffness of the space between the magnetic diaphragm and the planar coil. Thus, in addition to increasing the magnetism strength of the magnetic diaphragm, reducing the stiffness (i.e., tensile force) of the diaphragm can help increase the sensitivity of the microphones. Smaller $S_b$ or $S_d$ generally gives rise to higher sensitivity. Having small holes or stomata on the magnetic diaphragm 120 can help to reduce $S_d$ and improve sensitivity. The small holes or stomata on the magnetic diaphragm 120 can be generated by various methods, such as laser etching or chemical etching.

With the trend of microphones being miniaturized, the magnetic diaphragm 120 will preferably get smaller and smaller in size. To improve the smoothness of the microphone, the magnetic diaphragm 120 can have at least one stoma 150. The stoma 150 can help reduce the damping of the magnetic diaphragm 120, giving rise to improved sensitivity. In some embodiments, the magnetic diaphragm 120 is made of a Neodymium-Iron-Boron micro-power film (Nd—Fe—B film). Nd—Fe—B firm can help to further improve the sensitivity of the microphone.

The planar coil 110 can be arranged in various layout forms to fit the overall profile of the microphone. In some embodiments, the planar coil can be in the form of a thickly wound-up vortex, rectangle, polygon, or oval, etc. In some other embodiments, mechanisms, such as laser etching or chemical etching, can be utilized to generate miniaturized coils.

Figure 4:
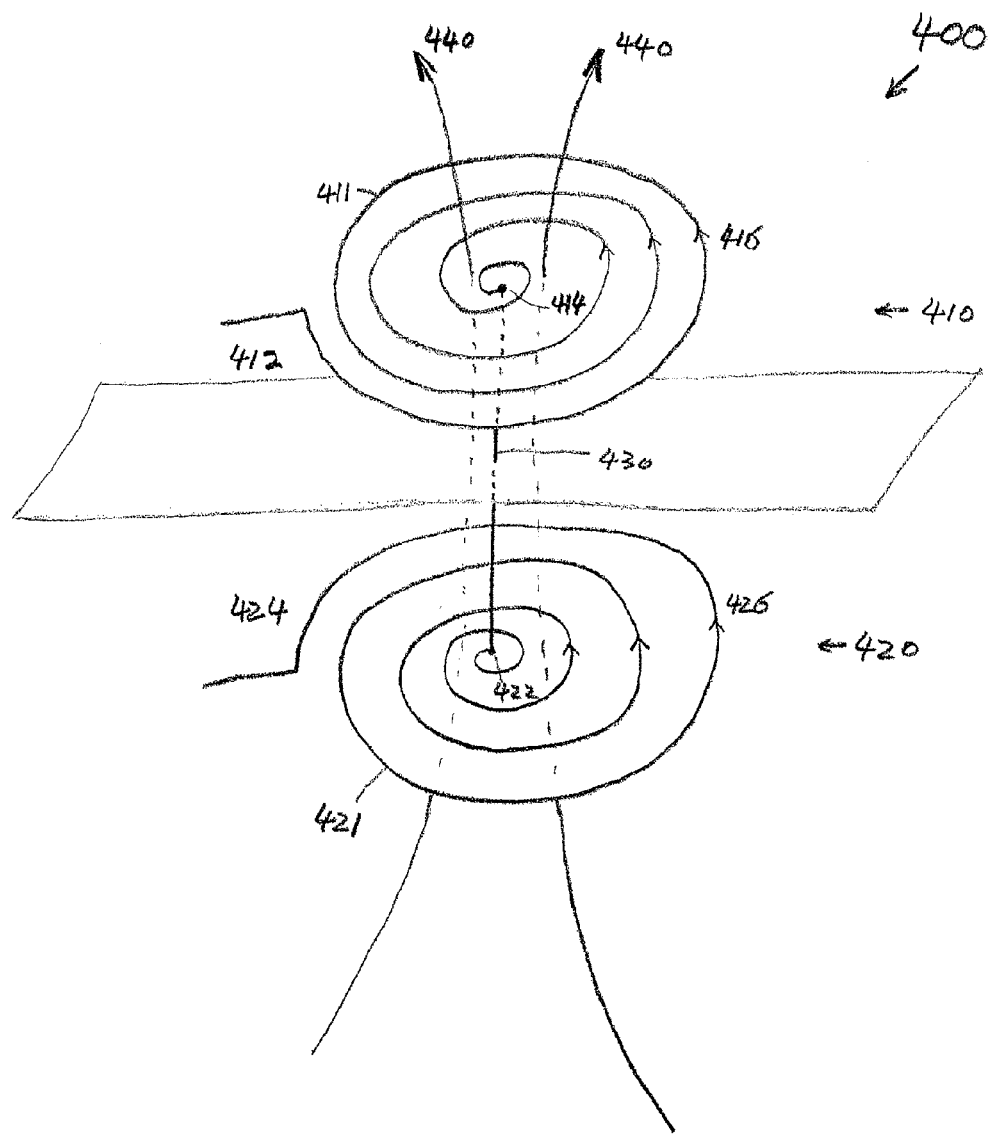
FIG. 4 illustrates a schematic view of a double-layer planar coil according to one embodiment of the invention.
Figure 5:
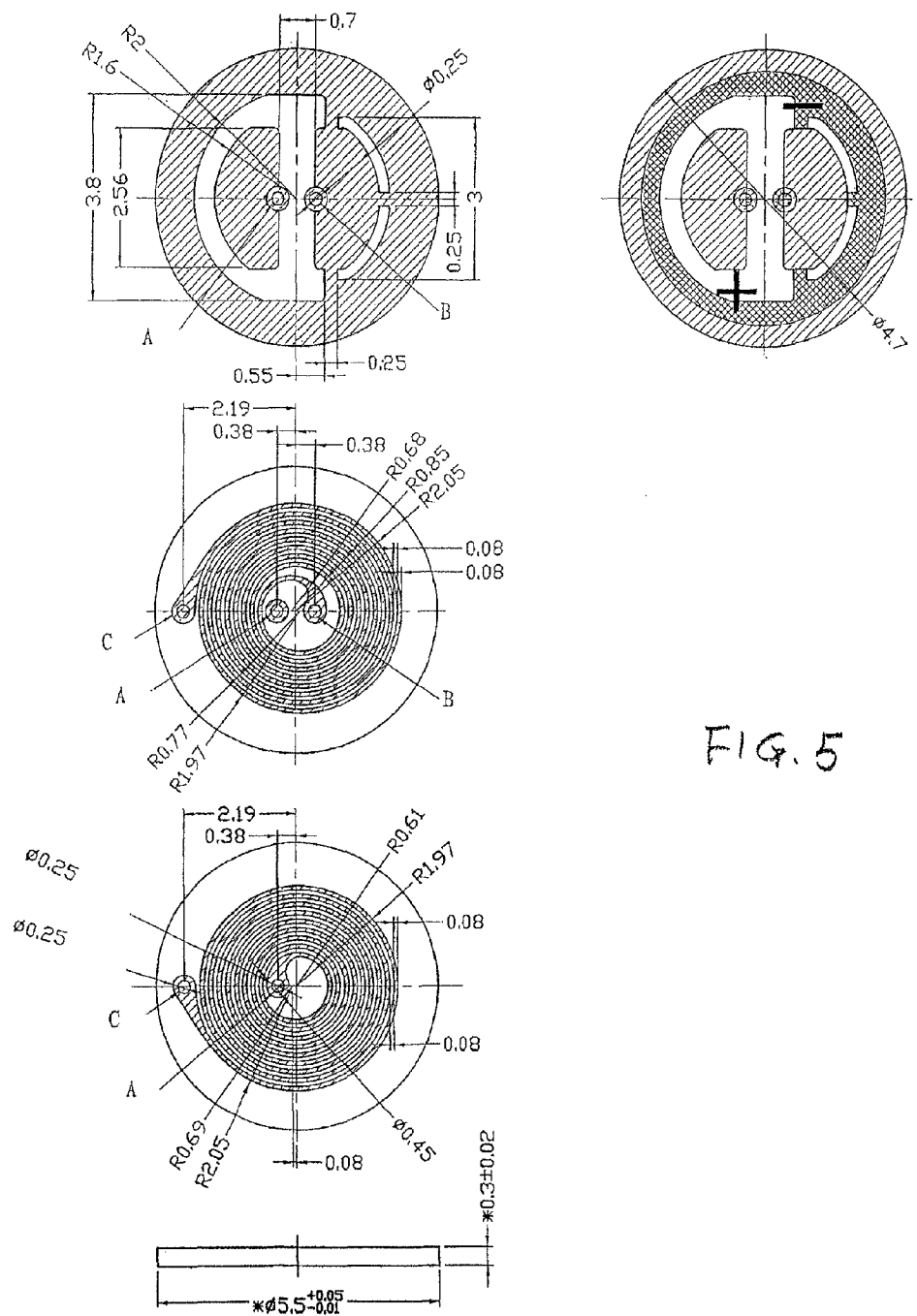
FIG. 5 illustrates planar view of different layers of a multi-layer planar coil according to another embodiment of the invention.

The planar coil 110 can also be laid in multiple layers. FIG. 4 illustrates one example of a double-layer planar coil. In FIG. 4, a double-layer planar coil 400 has two layers: a top layer 410 and a bottom layer 420. In the top layer 410, a wire 411 runs in a counter-clockwise direction 416 (looking from the top) from an outside edge 412 of the top layer 410 into the center 414 of the top layer 410. The wire 411 on the top layer 410 can form a planar vortex or any other desired layout (e.g., a rectangle, polygon, or oval, etc.) On the bottom layer 420, a wire 421 runs in a clockwise direction 426 (looking from the bottom) from the center 422 to an outside edge 424 of the bottom layer 420. The wire 421 on the bottom layer 420 can also form a planar vortex or any other desired layout (e.g., a rectangle, polygon, or oval, etc.) A connector 430 connects the top layer 410 and the bottom layer 420 at the centers 414 and 422 of the layers 410 and 420. The double-layer planar coil 400 can be connected to a power source at or near the outside edges 412 and 424. When connected to a power source, the electric current in the top layer 410 and in the bottom layer 420 runs in the same direction, either clockwise or counter-clockwise dependent upon the viewing direction. The same electric current direction in the top layer 410 and the bottom layer 420 can ensure that the magnetic field generated by the top layer 410 and the magnetic field generated by the bottom layer 420 have the same orientation 440 and therefore enhance each other. A planar coil can also be arranged in more than two layers as long as the directions of the electronic current are synchronized among layers. Illustrations of more multi-layer planar coil structures are shown in FIG. 5.

A multi-layer planar coil can be manufactured using a multilayer sheet. The multilayer sheet can preferably have conductive layers sandwiched between insulating layers. An example of a multilayer sheet suitable for this purpose is a multilayer Printed Circuit Board (PCB). Mechanisms, such as laser or chemical itching, can be used to form the desired wiring patterns (e.g., a planar vortex) on the conductive layers. Connecting the multi-layer planar coil to a power source at or near the outside edges 412 and 424 can help reduce the complexity of overall structure and increase the ease of manufacturing. It can also help reducing the variation or fluctuation of the electromagnetic characteristics at the connection points and thus help increasing the quality and reliability of the system.

Comparing to conventional microphones where the magnet is fixed, the magnet illustrated in FIGS. 1, 2, and 3 is dynamic and movable in response to exterior pressure (e.g., sound pressure). In addition, unlike in the conventional microphones where the coil is in a spiral form, the coil illustrated FIGS. 1, 2, and 3 is a coil array arranged on a plane. The planar coil helps to significantly reduce the vertical dimension of the microphone and thus helps to achieve miniaturization. Moreover, in the microphones illustrated in FIGS. 1, 2, and 3, the impedance of the microphones is preferably determined by the parameters of the planar coil. This helps to achieve low impedance, reducing or even eliminating the need for an impendence converter and making long-distance transmission easier. Furthermore, the microphones illustrated in FIGS. 1, 2, and 3 can also avoid the typical problems associated with condenser microphones, such as poor performance caused by the condenser microphone's thermo characteristics and susceptibility to electromagnetic interference. Therefore, the design illustrated in FIGS. 1, 2, and 3 can help to achieve a moving-magnet and planar coil microphone with small size, low impedance, low-cost and easy manufacturing, and high quality.

Because of their unique internal structure, the microphones illustrated in FIGS. 1, 2, and 3 can operate in different mechanisms from traditional moving-coil microphones. Traditional moving-coil microphones generate motional electromotive force (motional EMF) in the presence of sound pressure:

$$E_M=Blv,$$

where B is the magnetic field strength; l is the length of coil perpendicular to the magnetic field; and v is the velocity of the moving coil in the direction perpendicular to the magnetic field. In contrast, the microphones illustrated in FIGS. 1, 2, and 3 generate induced electromotive force (induced EMF):

$$E_I=(\Delta B/\Delta t)S,$$

where B is the magnetic field strength; t is the time, and S is the area of the planar coil; and where $(\Delta B/\Delta t)$ represents the variation rate of magnetic field strength when the magnetic diaphragm vibrates in the presence of the sound pressure.

The magnetic diaphragms can be manufactured in various processes. In one process, magnetic powders (e.g., Nd—Fe—B micro-powders) are first packaged then mixed into melted polymer. The Nd—Fe—B micro-powders are then infiltrated into the polymer film through thermal pressing and stretching.

In another process, magnetic powders (e.g., Nd—Fe—B micro-powders) are first evenly mixed within a gel. The gel is then coated onto a first polymer film via various methods, such as the sol-gel method or the rejection gel method. The first coated polymer film can then be combined with a second polymer film. The second polymer film can be made of the same polymer material as the first polymer film; or, it can be made of a different polymer material. The second polymer film can also be coated with Nd—Fe—B micro-powders. Preferably, the second coated polymer film is affixed to the first coated polymer film with the two coated surfaces facing inside. The layered polymer film can then be magnetized to generate a strong magnetic diaphragm.

Figure 6:
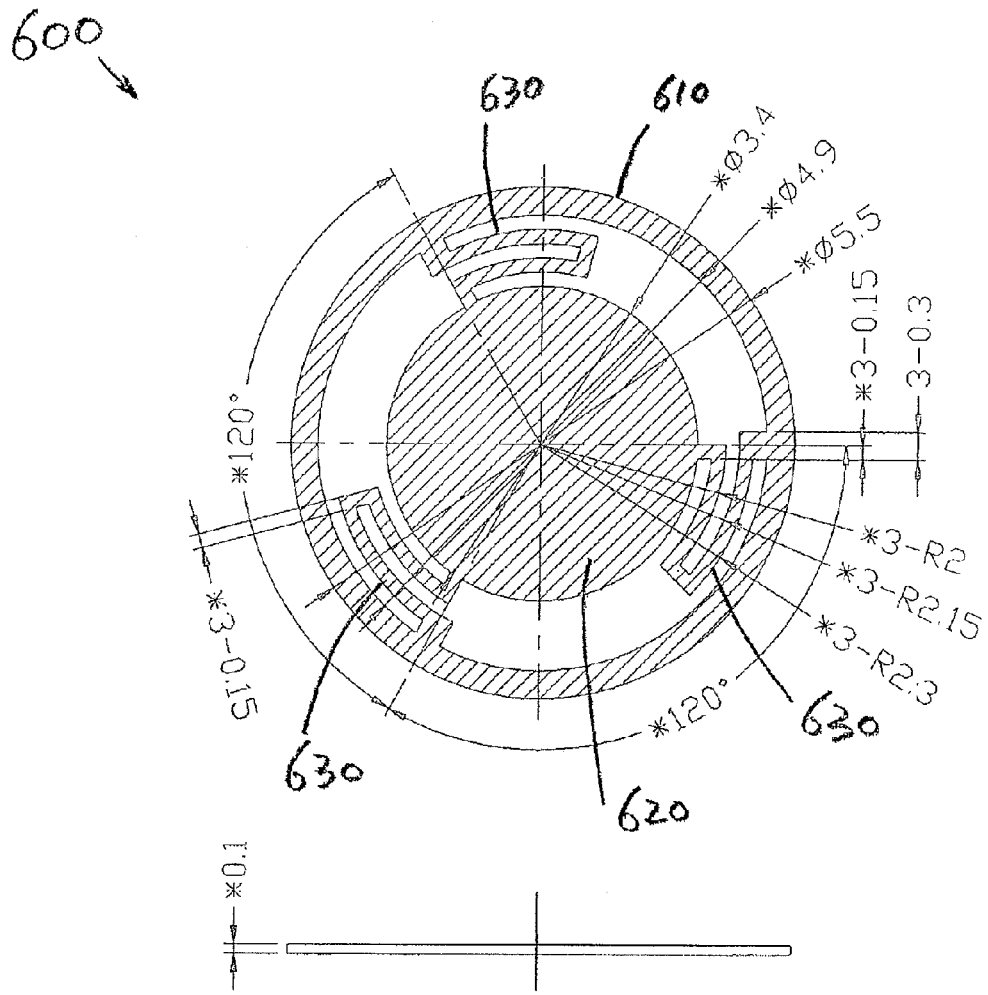
FIG. 6 illustrates a top view of a diaphragm according to one embodiment of the invention.

The magnetic diaphragms can also be manufactured from other materials, such as metal laminates. One example of such diaphragm is illustrated in FIG. 6. A diaphragm 600 can include an exterior ring structure 610. The ring structure 610 can be in various shapes, such as a circle, an oval, or a polygon. The ring structure 610 can be affixed to a supporting structure inside the microphone. The diaphragm 600 can also have an internal area 620 in various desired shapes. The internal area 620 can be connected to the exterior ring structure 610 via at least one connector 630. The connector 630 can be in such a shape that it can provide both support and elasticity to the center area 620 of the diaphragm 600. In FIG. 6, for example, the center area 620 can be suspended within the exterior ring structure 610 via at least one U-shape connectors 630. The center area 620 (and, optionally, other portions of the diaphragm 600) can be magnetized through various methods. One such method can be to affix or deposit magnetic powders (e.g., Nd—Fe—B micro-powders) onto the center area 620.

In other embodiments, the diaphragm itself can be non-magnetic; but a separate magnet can be attached to the diaphragm. When the diaphragm vibrates, the attached magnet can vibrate and thus generate electromotive force (EMF) within the magnetic field.

It is noted that one or more references may be incorporated herein. To the extent that any of the incorporated material is inconsistent with the present disclosure, the present disclosure shall control. Furthermore, to the extent necessary, any material incorporated by reference herein should be disregarded if necessary to preserve the validity of the claims.

While the description above refers to the invention, the description may include more than one invention. In addition, although the description above sometimes uses the term "microphone," the description is not so limited. Other electromagnetic devices are also possible.

What is claimed is:

1. An electromagnetic device comprising:
    a housing;
    a planar coil disposed inside the housing and fixed in the presence of exterior pressure, the planar coil comprising a plurality of layers; and
    a magnetic diaphragm disposed inside the housing and separated by a distance from the planar coil, the magnetic diaphragm comprising a layer of magnetic micro-powder and being moveable in the presence of the exterior pressure to induce an electromotive force upon the planar coil,
    wherein the plane of the planar coil is substantially in parallel with the plane of the magnetic diaphragm, and the plurality of layers is arranged such that a direction of the induced electromotive force upon the layers of the planar coil are synchronized among the layers.

2. The electromagnetic device in claim 1, wherein the planar coil comprises multiple layers, whereby magnetic fields generated from the multiple layers are in the same orientation.

3. The electromagnetic device in claim 1, further comprising a spacer positioned between the planar coil and the magnetic diaphragm.

4. The electromagnetic device in claim 1, wherein the magnetic diaphragm contains at least one stoma.

5. The electromagnetic device in claim 1, wherein the housing contains at least one stoma.

6. The electromagnetic device in claim 1, wherein the magnetic diaphragm is made of Nd—Fe—B micro-powder film.

7. The electromagnetic device in claim 1, wherein the planar coil is in the form of a wound-up vortex.

8. The electromagnetic device in claim 1, wherein the planar coil is in the form of a wound-up polygon.

9. The electromagnetic device in claim 1, wherein the magnetic diaphragm comprises:
    an exterior ring structure;
    an interior area; and
    at least one connector connecting the exterior ring structure and the interior area,
    wherein the interior area is magnetized.

10. The electromagnetic device in claim 1, wherein the planar coil comprises:
    a top layer;
    a bottom layer;
    an insulation layer separating the top layer and the bottom layer; and
    a connector electrically connecting the top layer and the bottom layer through the insulation layer.

11. The electromagnetic device in claim 10, wherein the planar coil is formed from a printed circuit board (PCB).

12. The electromagnetic device in claim 1, wherein the magnetic diaphragm comprises:
    a first polymer film layer with a first magnetic material layer coating a side of the first polymer film layer; and
    a second polymer film layer with a second magnetic material layer coating a side of the second polymer film layer;
    wherein the second polymer film layer is affixed to the first polymer film layer and the first magnetic material layer faces the second magnetic material layer.

13. An electromagnetic device comprising:
    a housing;
    a planar coil disposed inside the housing and fixed in the presence of exterior pressure, the planar coil comprising a plurality of layers; and
    a magnetic diaphragm disposed inside the housing and comprising a layer of magnetic micro-powder,
    wherein the plane of the planar coil is substantially in parallel with the plane of the magnetic diaphragm,
    wherein the planar coil is separated by a distance from the magnetic diaphragm, and the magnetic diaphragm is moveable in the presence of the exterior pressure to induce an electromotive force upon the planar coil, the planar coil comprising: wherein the planar coil comprises a top layer, a bottom layer; and a connector electrically connecting the top layer and the bottom layer through the insulation layer, and the plurality of layers is arranged such that a direction of the induced electromotive force upon the layers of the planar coil are synchronized among the layers.

* * * * *